United States Patent [19]
Becker et al.

[11] 4,153,216
[45] May 8, 1979

[54] APPARATUS FOR CHIP REMOVAL AND CHIP RECEIVING WHEN SEAMING METAL BANDS

[75] Inventors: Karl-Heinz Becker; Friedhelm Günther; Manfred Gerber; Werner Röll, all of Hamm, Fed. Rep. of Germany

[73] Assignee: Hoesch Werke Aktiengesellschaft, Dortmund, Fed. Rep. of Germany

[21] Appl. No.: 869,947

[22] Filed: Jan. 16, 1978

[30] Foreign Application Priority Data

Jan. 14, 1977 [DE] Fed. Rep. of Germany ....... 2701379

[51] Int. Cl.² ........................................... B65H 35/02
[52] U.S. Cl. .................................. 242/56.2; 242/56.4
[58] Field of Search ..................... 242/56.2, 56.4, 56.6, 242/56.7, 56.3, 56.9, 67.1 R

[56] References Cited

U.S. PATENT DOCUMENTS

| 2,202,883 | 6/1940 | Yoder | 242/56.4 X |
| 2,725,104 | 11/1955 | Wood | 242/56.4 |
| 3,871,290 | 3/1975 | Verboom | 242/56.2 |

Primary Examiner—Edward J. McCarthy
Attorney, Agent, or Firm—Becker & Becker, Inc.

[57] ABSTRACT

An apparatus for chip removal and chip receiving when trimming metal bands, which includes an automatically driven and self-controlling winding-up device for tautly winding-up the seam chip cut off from a metal band being trimmed. The apparatus furthermore includes a chip guiding device reciprocable alongside the chip winding-up region for guiding engagement with the chip being fed to the winding-up device.

3 Claims, 2 Drawing Figures

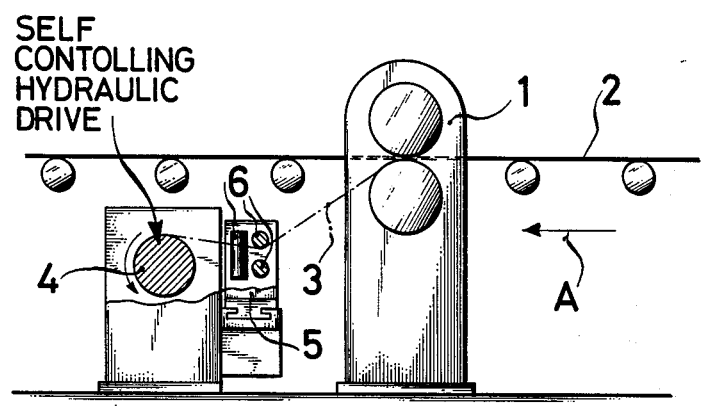
FIG. 1
FIG. 2
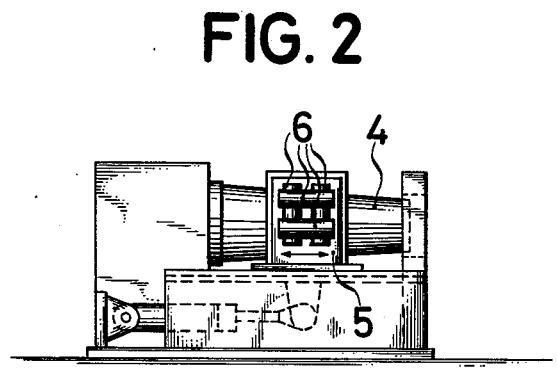

APPARATUS FOR CHIP REMOVAL AND CHIP RECEIVING WHEN SEAMING METAL BANDS

The present invention relates to an apparatus for chip removal and chip receiving when seaming metal bands. It has become known to withdraw the seam scrap by means of a chopping device. With such a device, the chip subjected to a draft is passed through a rigid guiding device and conveyed to the chopping device.

This arrangement has the drawback that in order to obtain a high service life for the chopping blades, it is not possible to chop different thicknesses of material. With a chopping device it should be borne in mind that with different thicknesses of material, the thickness of material must change from thin to thick. But even if this is taken into consideration, the blades must be renewed after certain time or at least post sharpened.

Furthermore, in addition to the wear of the chopping blade, thus also stopping times of the device have to be taken into consideration. A further drawback inherent to the chip removal via a chopping device consists in that considerable noise is developed with a chopping device.

For removing the chips in connection with a metal band seaming, a device has become known which comprises rigid chip removal means, a storage device, and a motor driven scrap winder. The chip is passed through the rigid guiding means and conveyed to the storage device where the chips are piled up as scrap. The piled up scrap is then pulled out from the storage device and this is effected by the driven scrap winder which has a slotted mandrel into which the scrap was previously introduced.

This known device has a number of drawbacks. Due to the fact that the chip guiding means is rigid, it will be appreciated that at this spot a partial wear and a source of disorder is created by the jamming of the chips. Furthermore, in view of the storage device, such chip withdrawal device requires considerable space. Also an operator is required who continuously observes the device and, depending on the requirements for instance if too much seam scrap is in the storage device, causes the scrap winder to move faster or slower or turns said scrap winder on or off.

It is, therefore, an object of the present invention to provide a chip removing and receiving device for use in connection with the seaming of metal bands, which device will overcome the drawbacks of the above mentioned heretofore known devices.

These and other objects and advantages of the invention will appear more clearly from the following specification in connection with the accompanying drawing, in which:

FIG. 1 diagrammatically shows a side view of a device for the chip removal and chip receiving.

FIG. 2 illustrates the device of FIG. 1 as seen in the direction of the arrow A.

The problem underlying the present invention has been solved by an automatically driven and automatically self-controlling winder which in a taut manner winds up the cut-off seaming chip, and by a chip guiding means which reciprocates along the winding-up region.

Referring now to the drawing in detail, the arrangement shown therein comprises a shear 1 which seams a metal band 2. The cut-off seaming chip 3 is conveyed to a winding up device 4 which is hydraulically driven and is automatically controlled in such a way that the cut-off chip 3 winds up in a taut manner. Prior to the winding-up operation, the seaming chip 3 passes through a chip guiding means 5. This chip guiding means 5 comprises a plurality of rollers 6 and is hydraulically reciprocable parallel to the longitudinal axis of the winding-up device 4.

It is also advantageous when for the winding-up device there is provided a hydraulic drive with automatic control. It is likewise advantageous when the chip guiding member has rollers for the chip guiding proper.

The device according to the present invention for chip removal and chip receiving when seaming metal bands operates practically free from noise, free from wear, and without time-consuming stopping or idling time while it saves space and cost.

It is, of course, to be understood that the present invention is, by no means, limited to the specific showing of the drawing, but also comprises any modifications within the scope of the appended claims.

What we claim is:

1. An apparatus for removing and receiving seam chips from metal bands being trimmed, which includes: automatically driven and self-controlling winding-up means for receiving and tautly winding-up the seam chips cut off from a metal band being trimmed, and chip guiding means reciprocable alongside the chip winding-up region for guiding engagement with the chip being fed to said winding-up means.

2. An apparatus according to claim 1, which includes self-controlling hydraulic driving means drivingly connected to said winding-up means.

3. An apparatus according to claim 1, in which said chip guiding means includes roller means.

* * * * *